United States Patent
Jin et al.

(10) Patent No.: US 9,366,865 B2
(45) Date of Patent: Jun. 14, 2016

(54) WEARABLE ELECTRONIC DEVICE WITH INTEGRATED ANTENNA

(71) Applicant: LENOVO (BEIJING) CO., LTD., Beijing (CN)

(72) Inventors: Liefeng Jin, Beijing (CN); Jin Liu, Beijing (CN); Jinqiang Lin, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 14/459,683

(22) Filed: Aug. 14, 2014

(65) Prior Publication Data

US 2015/0198806 A1    Jul. 16, 2015

(30) Foreign Application Priority Data

Jan. 10, 2014   (CN) .......................... 2014 1 0012674

(51) Int. Cl.
| | |
|---|---|
| *G06F 3/01* | (2006.01) |
| *G02B 27/01* | (2006.01) |
| *H01Q 1/38* | (2006.01) |
| *H01Q 1/44* | (2006.01) |
| *H01Q 9/42* | (2006.01) |

(52) U.S. Cl.
CPC .............. *G02B 27/017* (2013.01); *G06F 3/012* (2013.01); *H01Q 1/38* (2013.01); *H01Q 1/44* (2013.01); *H01Q 9/42* (2013.01); *G02B 2027/0178* (2013.01)

(58) Field of Classification Search
CPC ..................... G02B 27/017; G02B 2027/0178; H01Q 1/00; H01Q 1/38; H01Q 1/44; H01Q 9/42; G06F 3/012; G06F 3/013
USPC ............................................................ 345/8
See application file for complete search history.

(56) References Cited

U.S. PATENT DOCUMENTS

| | | | | | |
|---|---|---|---|---|---|
| 5,821,904 | A | * | 10/1998 | Kakizawa ............ | H01Q 1/1278 343/704 |
| 8,096,654 | B2 | * | 1/2012 | Amirparviz ...... | B29D 11/00826 345/8 |
| 2010/0110368 | A1 | * | 5/2010 | Chaum ................ | G02B 27/017 351/158 |
| 2013/0070198 | A1 | * | 3/2013 | Willey ................... | G02C 7/083 351/158 |
| 2013/0077175 | A1 | * | 3/2013 | Hotta ....................... | G02B 3/08 359/630 |
| 2013/0250233 | A1 | * | 9/2013 | Blum ..................... | G02C 11/10 351/158 |
| 2014/0267208 | A1 | * | 9/2014 | Yajima ................ | G02B 27/017 345/211 |

* cited by examiner

*Primary Examiner* — Larry Sternbane
(74) *Attorney, Agent, or Firm* — Peter Su; Dentons US LLP

(57) ABSTRACT

The invention discloses a wearable electronic device, comprising a fixing component, at least one display component fixedly provided on the fixing component and a signal transceiver component provided on the display component; when a user wears the wearable electronic device, the fixing component maintains a relative positional relationship between the wearable electronic device and the user's head; the display component includes a transparent module whose light transmittance is greater than a first light transmittance; the signal transceiver component is for receiving and transmitting a signal, is of a slice shape, and has a hollow geometric pattern constituted by two or more lines.

10 Claims, 4 Drawing Sheets

WEARABLE ELECTRONIC DEVICE WITH INTEGRATED ANTENNA

CROSS REFERENCE TO RELATED APPLICATIONS

This application claims the benefit under 35 U.S.C. §119(a) of Chinese Patent Application No. 201410012674.3, filed on Jan. 10, 2014, the disclosure of which is incorporated by reference herein in its entirety.

FIELD OF THE INVENTION

The present disclosure relates to electronic technology, and more particularly to a wearable electronic device.

BACKGROUND OF THE INVENTION

With the continuous development of science and technology, electronic technology has developed rapidly, with electronic products becoming more and more diversified. People enjoy the convenience of this technology development, such as a comfortable life by using a variety of electronic devices, such as a wearable electronic device.

In the prior art, the wearable electronic device, such as the wearable glasses (also known as smart glasses), may have the same functionality that of a smart mobile phone, such as map navigation, interacting with friends, creating photos and videos, starting a video call with friends, achieving wireless network access via a mobile communication network, among others.

Currently, an antenna is usually situated inside the lens rim or glass legs of the wearable glasses, as shown in FIG. 1. However, since an antenna takes up space, placing the antenna inside the lens rim or glass legs requires the lens rim or glass legs to have a larger capacity, thus reducing the comfort and affecting normal use of the wearable glasses.

SUMMARY OF THE INVENTION

To solve the technical problem existing in the prior art, embodiments of the present disclosure provide a wearable electronic device.

Embodiments of the present disclosure provide a wearable electronic device, comprising a fixing component, at least one display component fixedly provided on the fixing component and a signal transceiver component provided on the display component; when a user wears the wearable electronic device, the fixing component is maintains a relative positional relationship between the wearable electronic device and the user's head; the display component includes a transparent module whose light transmittance is greater than a first light transmittance; the signal transceiver component is for receiving and transmitting a signal, is of a slice shape, and has a hollow geometric pattern constituted by two or more lines.

Wherein the signal transceiver component is located in a first region of the display component, the first region being different from the central region of the display component.

Wherein a proportion of area occupied by the first region in area of the display component is less than a first proportion.

Wherein the geometric pattern includes a parallel line pattern and/or a grid pattern formed by the lines, the grid pattern includes two or more cell meshes constituted by intersected lines.

Wherein when the lines are parallel, a distance between the lines is greater than a first length.

Wherein area of each cell mesh is larger than a first area.

Wherein width of each line is smaller than a second length.

Wherein light transmittance of each line is larger than a second light transmittance.

Wherein the transparent module includes a first layer of light transparent portion and a second layer of light transparent portion, the signal transceiver component is located between the first layer of light transparent portion and the second layer of light transparent portion that are bound.

Wherein the transparent module includes a first surface and a second surface, when the user wears the wearable electronic device, light travels through the first surface and the second surface and enters the human eye, the signal transceiver component is affixed to the first surface or the second surface.

Wherein the fixing component is a frame structure including a first portion, a second portion, and a third portion, the first portion is for fixing the display component, the second portion is for engaging the first portion and the third portion, and the third portion is for being contacted with the user's head, so as to maintain the relative positional relationship between the wearable electronic device and the user's head.

From the above, the technical solution of embodiments of the present disclosure comprises a fixing component, at least one display component fixedly provided on the fixing component and a signal transceiver component provided on the display component; when a user wears the wearable electronic device, the fixing component maintains a relative positional relationship between the wearable electronic device and the user's head; the display component includes a transparent module whose light transmittance is greater than a first light transmittance; the signal transceiver component is for receiving and transmitting a signal, is of a slice shape, and has a hollow geometric pattern constituted by two or more lines. Thereby, by providing the signal transceiver component on the display component, the present disclosure can avoid the space of the lens rim or glass legs being taken up by the antenna, so that the capacity of the lens rim or glass legs is reduced, and further, normal use of the wearable glasses is ensured.

DETAILED DESCRIPTION OF THE PREFERRED EMBODIMENTS

Figure 1:
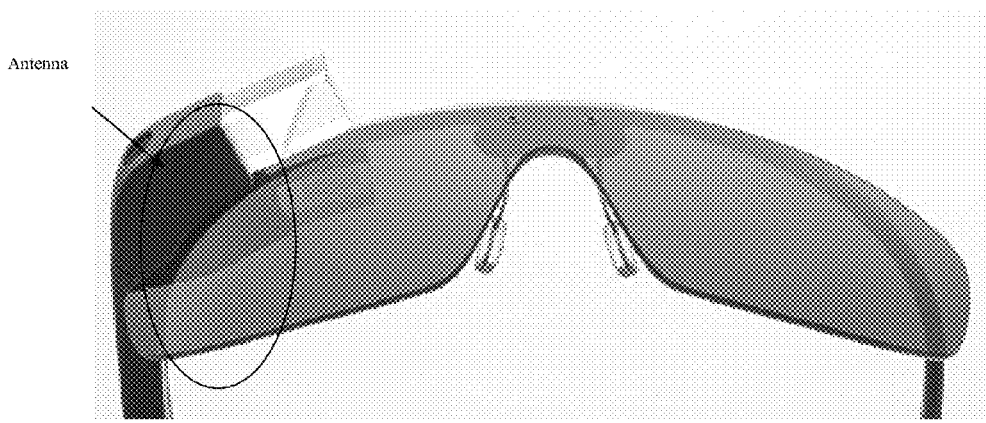
FIG. 1 is a schematic block diagram of structure of a wearable electronic device in the prior art.
Figure 2:
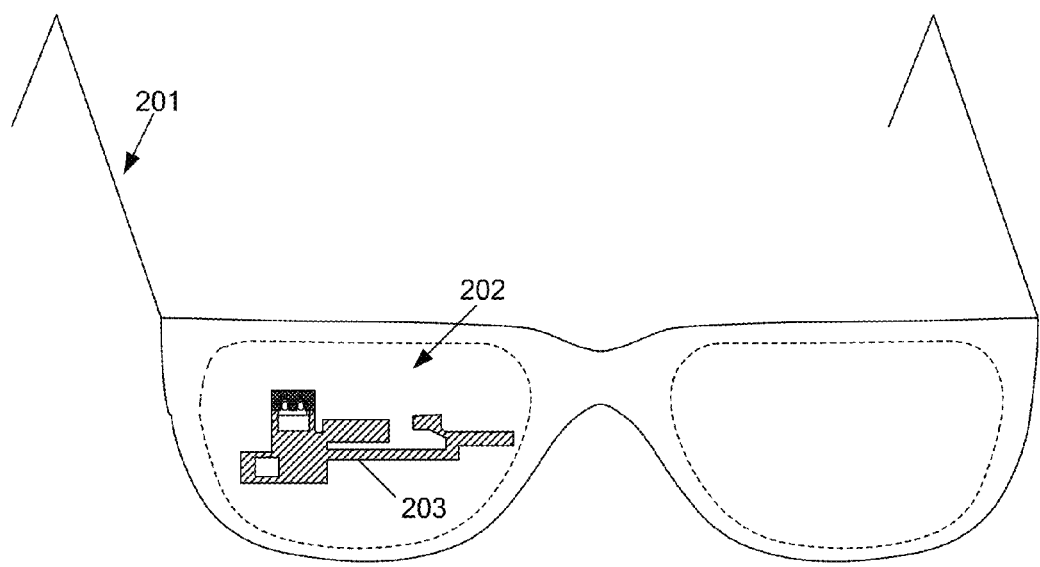
FIG. 2 is a schematic block diagram of structure of a first embodiment of a wearable electronic device provided by the present disclosure.

In a first embodiment of the wearable electronic device provided by the present disclosure, as shown in FIG. 2, the wearable electronic device comprises a fixing component 201, at least one display component 202 fixedly provided on the fixing component and a signal transceiver component 203 provided on the display component;

When a user wears the wearable electronic device, the fixing component 201 maintains a relative positional relationship between the wearable electronic device and the user's head.

Herein, the fixing component is a frame structure including a first portion, a second portion, and a third portion, the first portion is for fixing the display component, the second portion is for engaging the first portion and the third portion, and the third portion is for being contacted with the user's head, so as to maintain the relative positional relationship between the wearable electronic device and the user's head.

In practice, the fixing component 201 may be constituted by lens rim and glass legs.

The display component 202 includes a transparent module whose light transmittance is greater than a first light transmittance.

The user can view an image on the other side of the transparent module through the transparent module.

Herein, the display component 202 may further include a display screen, which may be provided on a surface of the transparent module.

In practice, the transparent module may be lenses, which may be made of glass, plastic, or other materials.

The signal transceiver component 203 is for receiving and transmitting a signal, is of a slice shape, and has a hollow geometric pattern constituted by two or more lines.

Herein, when there are two display components 202, it is possible to, according to actual situations, provide the signal transceiver component 203 to one display component 202, or to two display components 202. The signal transceiver component 203 may be an antenna.

In practice, in order to reduce the effect caused by the signal transceiver component on an object to be viewed, the fixing component 201 may control the signal transceiver component 203 to have a distance of one to three cm from the eyes.

Thereby, in this embodiment, by providing the signal transceiver component on the display component, it is possible to avoid the space of the lens rim or glass legs being taken up by the antenna, so that the capacity of the lens rim or glass legs is reduced, and further, normal use of the wearable glasses is ensured.

Figure 3:
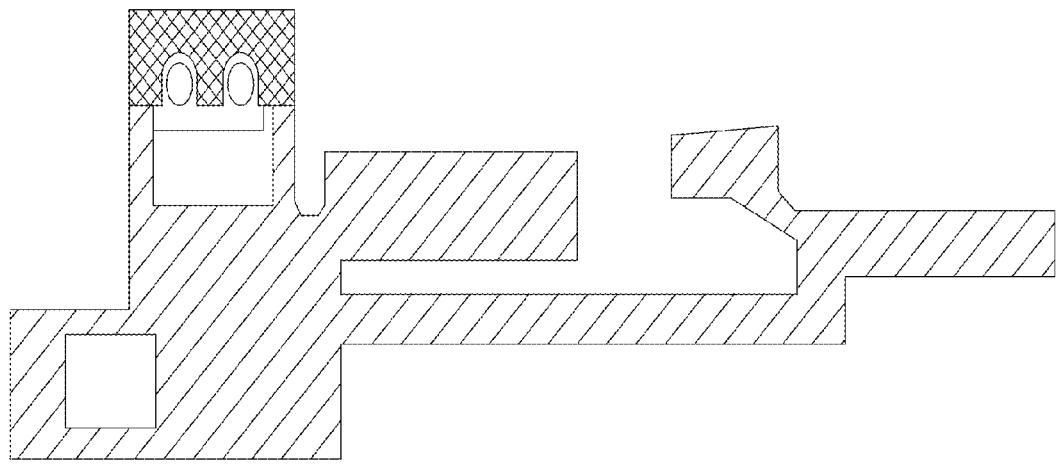
FIG. 3 is a schematic block diagram of structure of a signal transceiver component provided by an embodiment of the present disclosure.

In an embodiment, as shown in FIG. 3, the geometric pattern includes a parallel line pattern and/or a grid pattern formed by the lines, the grid pattern includes two or more cell meshes constituted by intersected lines.

Herein, a specific shape of the geometric pattern is determined by the performance to be achieved by the antenna, no limitation is made thereto.

In practice, in order to reduce the effect caused by the signal transceiver component on an object to be viewed, thickness of the geometric pattern may be less than 0.03 mm.

Accordingly, in these embodiments, the geometric pattern includes a parallel line pattern and/or a grid pattern formed by the lines, the parallel line pattern and/or mesh pattern increases the light transmittance, thereby reducing the effect caused by the signal transceiver component on an object to be viewed, thereby enhancing the visual effect.

In an embodiment, when the lines are parallel, a distance between the lines is greater than a first length.

Herein, the first length may be a multiple of the width of the line, e.g., ten times.

In practice, in order to reduce the effect caused by the signal transceiver component on an object to be viewed, the distance between the lines may be greater than 0.3 mm.

Accordingly, in this embodiment, when the lines are parallel, the distance between the lines is greater than the first length, and the greater the distance between the lines, the lesser the effect caused by the signal transceiver component on an object to be viewed, thereby enhancing the visual effect.

In an embodiment, area of each cell mesh is larger than a first area.

In practice, in order to reduce the effect caused by the signal transceiver component on an object to be viewed, area of each cell mesh may be greater than 0.1 square millimeters.

Accordingly, in this embodiment, area of each cell mesh is larger than the first area, and the larger the area of each cell mesh, the lesser the effect caused by the signal transceiver component on an object to be viewed, thereby enhancing the visual effect.

In an embodiment, width of each line is smaller than a second length.

In practice, in order to reduce the effect caused by the signal transceiver component on an object to be viewed, width of each line may be less than 0.03 mm.

Accordingly, in this embodiment, the width of each line is smaller than the second length, and the smaller the width of each line, the lesser is the effect caused by the signal transceiver component on an object to be viewed, thereby enhancing the visual effect.

In an embodiment, light transmittance of each line is larger than a second light transmittance.

Herein, it is possible to make the line extremely thin or make the line with materials having a better transmittance to improve the light transmittance.

Accordingly, in this embodiment, the light transmittance of the line is greater than the second transmittance, so that the light transmittance is increased, thereby reducing the effect caused by the signal transceiver component on an object to be viewed and enhancing the visual effect.

In a second embodiment of the wearable electronic device provided by the present disclosure, the electronic device comprises a fixing component 201, at least one display component 202 fixedly provided on the fixing component and a signal transceiver component 203 provided on the display component.

When a user wears the wearable electronic device, the fixing component 201 maintains a relative positional relationship between the wearable electronic device and the user's head.

The display component 202 includes a transparent module whose light transmittance is greater than a first light transmittance.

The signal transceiver component 203 is for receiving and transmitting a signal, is of a slice shape, and has a hollow geometric pattern constituted by two or more lines.

Figure 4:
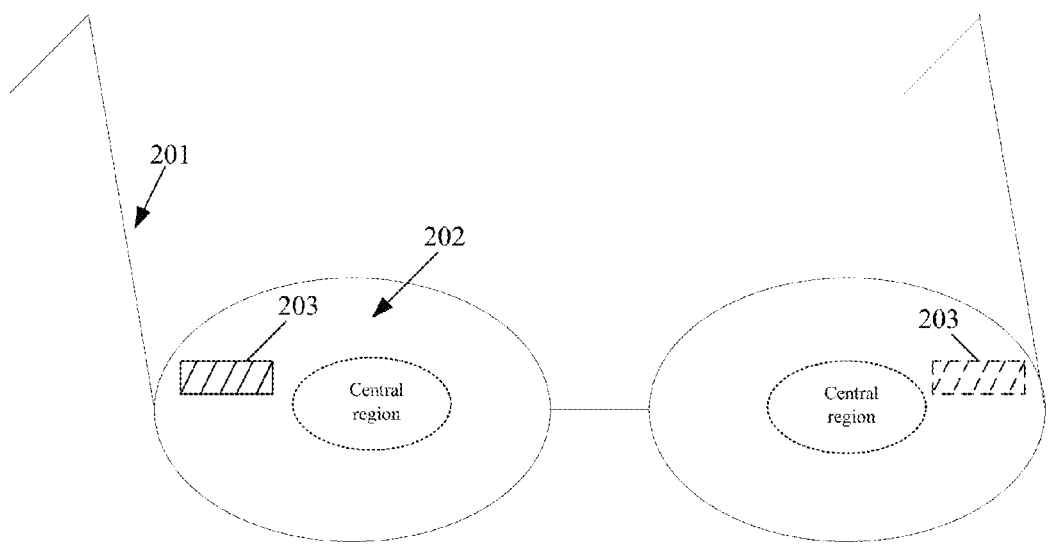
FIG. 4 is a schematic block diagram of structure of a second embodiment of the wearable electronic device provided by the present disclosure.

The signal transceiver component 203 is located in a first region of the display component, the first region is different from a central region of the display component, as shown in FIG. 4.

Herein, when there are two display components 202, it is possible to, according to actual situations, provide the signal transceiver component 203 to one display component 202, or to two display components 202.

Herein, the central area is a main vision zone of the human eye.

Figure 5:
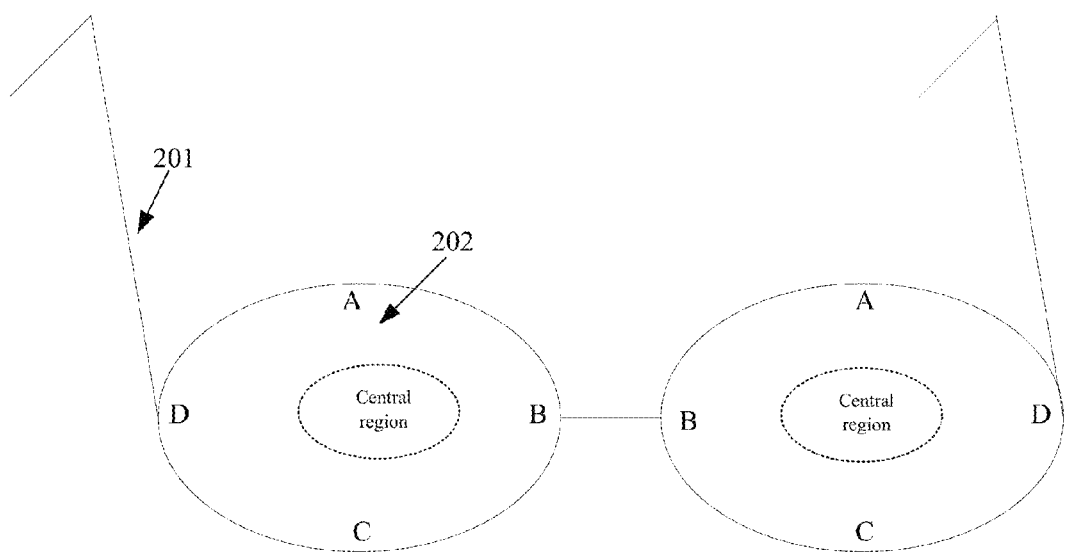
FIG. 5 is a schematic block diagram of structure of an embodiment of a wearable electronic device provided by the present disclosure.
Figure 6:
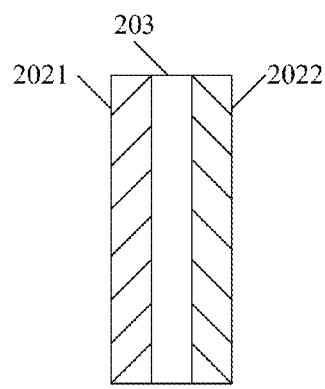
FIG. 6 is a sectional schematic view of a transparent module provided by an embodiment of the present disclosure.

In practice, the farther the first region is away from the central area, the better. For example, it is possible to set the first area in regions A, B, C, D as shown in FIG. 5, in particular, it is preferable to set the first region in a lower part or an external side of the display component 202, for example, region C, D are preferred. The signal transceiver component 203 may be provided in a certain region among A, B, C, D concentratedly, or may also be provided in each region of A, B, C, D dispersedly.

Accordingly, in this embodiment, the first region where the display component is placed is different from a central region of the display component, thereby reducing the effect caused by the signal transceiver component on an object to be viewed and enhancing the visual effect.

In an embodiment, a proportion of area occupied by the first region in area of the display component is less than a first proportion.

Accordingly, a proportion of area occupied by the first region in area of the display component is less than a first proportion, e.g., 5%, the smaller the area of the first region, the lesser is the influence caused by the signal transceiver component on an object to be viewed, thereby enhancing the visual effect.

In a third embodiment of the wearable electronic device provided by the present disclosure, the electronic device comprises a fixing component 201, at least one display component 202 fixedly provided on the fixing component and a signal transceiver component 203 provided on the display component.

When a user wears the wearable electronic device, the fixing component 201 maintains a relative positional relationship between the wearable electronic device and the user's head.

The display component 202 includes a transparent module whose light transmittance is greater than a first light transmittance.

The signal transceiver component 203 is for receiving and transmitting a signal, is of a slice shape, and has a hollow geometric pattern constituted by two or more lines.

The transparent module includes a first layer of light transparent portion 2021 and a second layer of light transparent portion 2022, the signal transceiver component 203 is located between the first layer of light transparent portion 2021 and the second layer of light transparent portion that are bound 2072.

Accordingly, in this embodiment, the signal transceiver component 203 is placed in the middle of the inner and outer lenses, thereby reducing, better protection to the signal transceiver component, to avoid the signal transceiver component from being scratched, which may affect its functionality.

In an embodiment, the transparent module includes a first surface and a second surface, when the user wears the wearable electronic device, light travels through the first surface and the second surface and enters the human eye, the signal transceiver component is affixed to the first surface or the second surface.

Accordingly, in this embodiment, the transparent module is affixed to the first surface or the second surface of the transparent module, which can simplify the structure of the transparent module, save materials of the transparent module, and achieve a simple manufacturing process.

Figure 7:
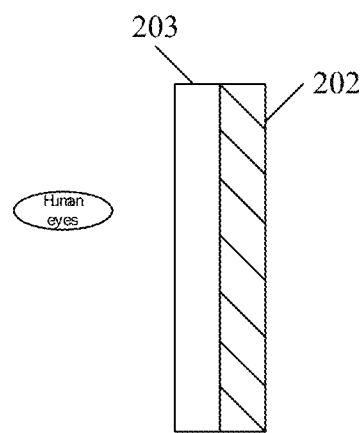
FIG. 7 is a sectional schematic view of a transparent module provided by an embodiment of the present disclosure.

In practice, light travels through the first and second surfaces successively, and then enters the human eye, the signal transceiver component is affixed on the second surface, as shown in FIG. 7. When the lenses are a piece of glass, the second surface is closer to the human eye, and when the lenses have a certain thickness, the display component is placed on the second surface that is closer to the human eye, thereby reducing the effect caused by the signal transceiver component on an object to be viewed, and enhancing the visual effect.

In an embodiment, the electronic device further comprises a detecting component and a promoting component.

When the user wears the electronic device, the detecting component detects a distance between a first detection region of the display component to a second detection region of the user's head, and obtains a detection result.

When the detection result is larger than a third length, the prompting component generates and outputs information to prompt the user to adjust the relative positional relationship between the wearable electronic device and the user's head.

Accordingly, in this embodiment, when the human eye is too far away from the lenses, the user is prompted to adjust the position of the glasses, to improve the effect of viewing an object.

In the several embodiments provided by the present application, it should be understood that the disclosed device and method may be implemented in other ways. The device embodiments described above are merely illustrative; for example, the division of the units only is a logical division of functions, there may be other division methods in practical implementations (for instance, a plurality of units or components may be combined, or may be integrated into another system, or certain features may be omitted or not carried out). Further, the coupling or direct coupling or communicative connection between the respective components shown or discussed therein may be carried out via certain interfaces, and indirect coupling or communicative connection between devices or units may be electrical, mechanical, or others forms.

The above units described as a separate member may be, or may not be, physically separated, the components shown as a unit may or may not be a physical unit; they may be located in one place, or may be situated on a plurality of network units; it is possible to select part or all units among them according to actual needs to achieve the aim of the solution of the embodiments.

In addition, the respective functional units in the respective embodiments of the present disclosure may be all integrated within one processing unit, and whilst it may also be that each unit serves as a unit independently, it may also be that two or more units are integrated within one unit; the aforesaid integrated unit can not only be implemented in the form of hardware, but can also be implemented in the form of hardware plus software functional units.

A person of ordinary skill in the art can understand that all or part of the steps for implementing the aforesaid method embodiments may be completed through hardware related to the program instructions, the program may be stored in a computer readable storage medium, and the steps of the above method embodiments are executed when the program is executed; the storage medium comprises a removable storage device, a Read-Only Memory (ROM), a Random Access Memory (RAM), a magnetic disk, or an optical disk, and other various mediums that can store program codes.

Alternatively, when the above-integrated unit of the present disclosure is implemented in the form of software functional modules and sold and used as an independent product, it is possible to store in a computer readable storage medium. Based on such understanding, the substance or the parts that contribute over the prior art of the technical solution of the embodiments of the present disclosure may be embodied in the form of a software product. This computer software product is stored in a storage medium, which includes several instructions in use for causing a computer device (which may be a personal computer, a server, or a network equipment) to implement all or part of the method of various embodiments of the present disclosure. The aforesaid storage medium includes a removable storage device, a Read-Only Memory (ROM), a Random Access Memory (RAM), a magnetic disk, or an optical disk, and other various mediums that can store program codes.

The above are only specific embodiments of the present disclosure, but the protection scope of the present disclosure is not limited thereto. Variations or replacements that are readily conceivable for those skilled in the art within the technical scope disclosed by the present disclosure should all fall into the protection scope of the present disclosure. Accordingly, the protection scope of the present disclosure should be subjected to the protection. scope of the claims.

What is claimed is:

1. A wearable electronic device, comprising: a fixing component, at least one display component fixedly provided on the fixing component and a signal transceiver component provided on the display component;
the fixing component is for, when a user wears the wearable electronic device, maintaining a relative positional relationship between the wearable electronic device and the user's head;
the display component includes a transparent module whose light transmittance is greater than a first light transmittance;
the signal transceiver component is for receiving and transmitting a signal and has a hollow geometric pattern constituted by two or more lines,
wherein the transparent module includes a first layer of light transparent portion and a second layer of light transparent portion, the signal transceiver component is located between the first layer of light transparent portion and the second layer of light transparent portion that are bound.

2. The wearable electronic device according to claim 1, wherein the signal transceiver component is located in a first region of the display component, the first region is different from a central region of the display component.

3. The wearable electronic device according to claim 2, wherein a proportional area $A_1$ occupied by the first region is less than an area $A_2$ of the display component.

4. The wearable electronic device according to claim 1, wherein the geometric pattern includes a parallel line pattern and/or a mesh pattern formed by the lines, the mesh pattern includes two or more cell meshes constituted by intersected lines.

5. The wearable electronic device according to claim 4, wherein when the lines are parallel, a distance between the lines is greater than a first length.

6. The wearable electronic device according to claim 4, wherein the area of each cell mesh is larger than a first area.

7. The electronic device according to claim 1, wherein the width of each line is smaller than a second length.

8. The wearable electronic device according to claim 1, wherein light transmittance of each line is larger than a second light transmittance.

9. The wearable electronic device according to claim 1, wherein the transparent module includes a first surface and a second surface, when the user wears the wearable electronic device, light travels through the first surface and the second surface and comes into human eyes, the signal transceiver component is affixed to the first surface or the second surface.

10. The wearable electronic device according to claim 1, wherein the fixing component is a frame structure including a first portion, a second portion, and a third portion, the first portion is for fixing the display component, the second portion is for engaging the first portion and the third portion, and the third portion is for being contacted with the user's head, so as to maintain the relative positional relationship between the wearable electronic device and the user's head.

\* \* \* \* \*